United States Patent [19]

Reid

[11] 3,977,377
[45] Aug. 31, 1976

[54] HEAT DISTRIBUTION PASSAGE FOR MANIFOLD HEATER SYSTEM

[75] Inventor: David L. Reid, Columbus, Ind.
[73] Assignee: Cummins Engine Company, Inc., Columbus, Ind.
[22] Filed: Apr. 9, 1975
[21] Appl. No.: 566,320

[52] U.S. Cl. .................... 123/122 G; 123/179 H; 123/52 M
[51] Int. Cl.² .......................................... F02M 31/00
[58] Field of Search ........ 123/122 D, 179 H, 122 G, 123/52 M, 122 R

[56] References Cited
UNITED STATES PATENTS
3,687,122  8/1972  Kamo ............................ 123/179 H Primary Examiner—Charles J. Myhre
Assistant Examiner—R. H. Lazarus
Attorney, Agent, or Firm—Gary M. Gron; Robert T. Ruff

[57] ABSTRACT

The disclosure illustrates a heat distribution passage for the intake manifold of an internal combustion engine having a burner type manifold air preheater. The preheater is positioned in an elongated intake manifold having spaced inlet ports which carry intake air to the cylinders of the engine. The preheater is adjacent some, but not all, of the inlet ports. The distribution passage extends from a point adjacent the preheater to an outlet at a remote engine intake port opening. When an engine intake valve is opened to pass air into a cylinder, the intake port has a momentary reduction in pressure. This reduction causes heated air to pass from the preheater through the passage and into the intake port where it is mixed with the nonheated intake air. Proper sizing of the tube in relation to the port area assures even distribution of heat between all of the intake ports.

9 Claims, 5 Drawing Figures

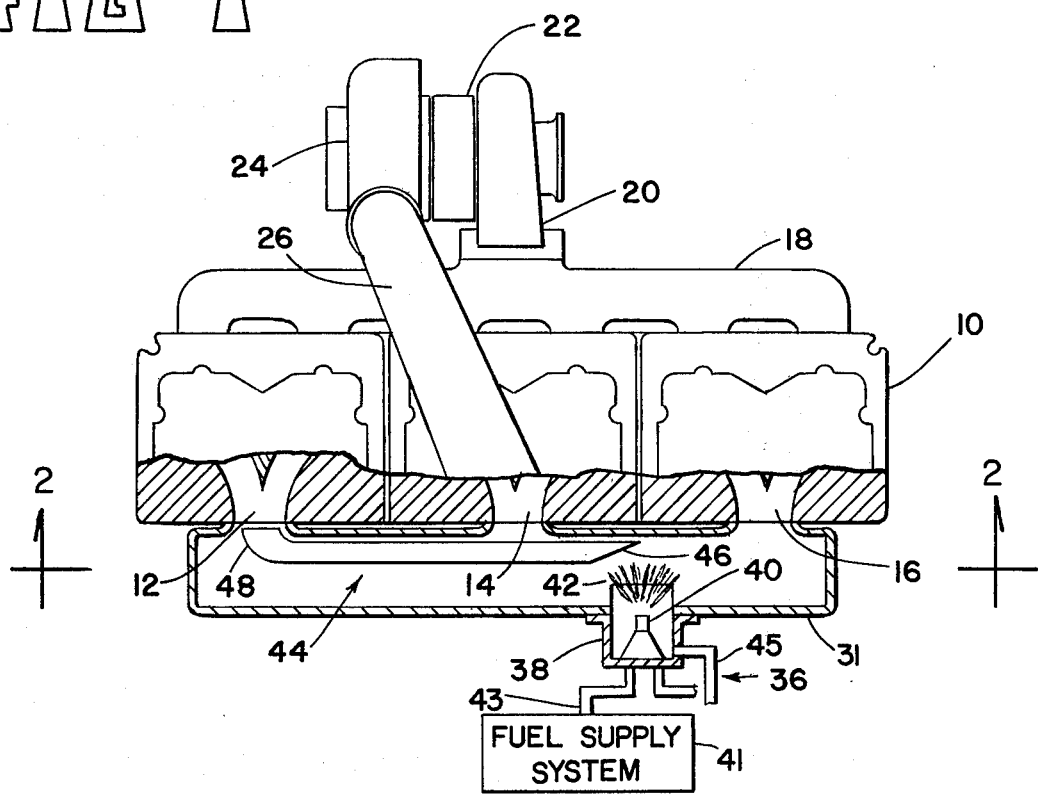
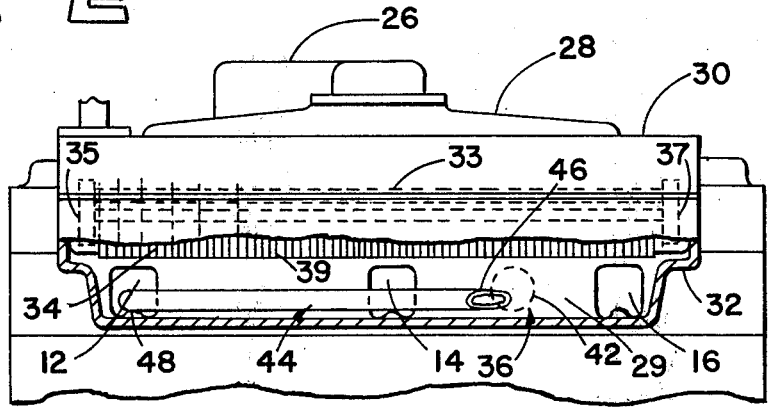

STATIC AIR DEPRESSION IN INTAKE PORT 12

HEAT DISTRIBUTION PASSAGE FOR MANIFOLD HEATER SYSTEM

The present invention relates to intake manifold preheating systems for internal combustion engines and more specifically to systems which incorporate a burner for preheating.

It is well known that when ambient air temperatures are sufficiently low, a diesel engine requires assistance, such as the heating of the intake air, to enable the engine to start. In addition, modern turbocharged and aftercooled engines require heating of intake air during certain operating conditions to avoid the occurrence of white smoke and other undesirable exhaust emissions. One approach that has been tried is to use a burner which injects a spray of fuel into a burner assembly for combustion with intake air. A flame is produced which heats the intake air sufficiently to permit start up or minimize white smoke emissions.

Many systems have been proposed that incorporate burners. Examples are shown in the patent to Tramontini (3,534,723), the Kamo patents No. (3,526,214 and No. 3,687,122), and the patent to Briggs, et al, (3,829,281). One of the common objects in systems of these types is to provide an equal distribution of heat to the various cylinders of an engine. Since the cylinders are spaced from one and another as in an in-line engine or in a bank of a V engine, the burner must be placed at a point where substantially all of the intake air passes. Frequently engines of the above type incorporate an aftercooler for the attainment of higher output horsepower. These aftercoolers are positioned between the outlet of a turbocharger compressor and the inlets to the engine cylinders. While the entry to the aftercooler may be in the form of a narrow conduit, the aftercooler itself is relatively elongated and the air passes through in a direction at right angles to its length. Thus, there is essentially a sheet of air passing from the aftercooler to the intake ports. It is necessary to position a burner between the aftercooler and the inlet ports of the engine for proper operation. In this arrangement there is no point downstream of the intercooler where all of the flow passes. As a result, a burner of this type by itself will not provide an even distribution of heat to the engine inlet ports.

The above problems are solved in the environment of an air breathing internal combustion engine which includes at least a pair of spaced intake ports for receiving air and a manifold for distributing the air to the intake ports. The manifold mounts an intake air preheater assembly for local heating of intake air adjacent one of the ports and remote from the other. The invention comprises a means of forming a passage within the manifold from an inlet adjacent the preheater assembly and extending to an outlet positioned at the remote intake port opening so that a portion of the heated air is drawn through the passage from the burner to the remote port.

The above and other related features of the present invention will be apparent from a reading of the following description of the disclosure shown in the accompanying drawings and the novelty thereof pointed out in the appended claims.

In the drawings:

FIG. 1 is a simplified plan view of a heat distribution passage embodying the present invention along with cooperating sections of an internal combustion engine with which it is used.

FIG. 2 is a side view of the engine of FIG. 1 taken on line 2—2 of FIG. 1.

Figure 3:
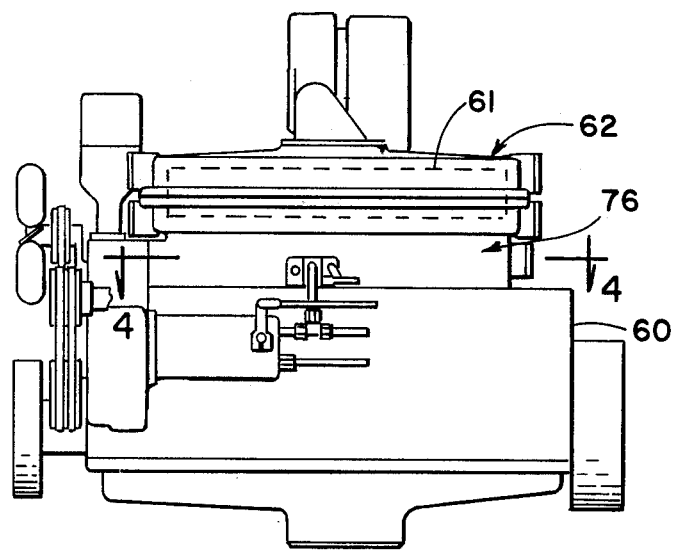
FIG. 3 is a side view of a V-type engine using a heat distribution passage embodying the present invention.

Referring to FIG. 1, there is shown an internal combustion engine 10 of the compression ignition type, commonly referred to as a diesel engine. The details of the operation of an engine of this type are so well known by those skilled in the art that they will not be repeated to simplify the discussion of this invention. Briefly, however, the diesel engine compresses air in cylinders by pistons (both not shown) so that its temperature is high enough to spontaneously ignite fuel injected into each cylinder at the top of the compression stroke. The resultant explosion drives the pistons downward and produces a rotary output through an engine crankshaft (not shown). The exhaust gases are expelled from the engine 10 through an exhaust manifold 18. The exhaust manifold 18 directs the exhaust gases across a turbine 20 of a turbocharger assembly 22. The turbine 20 drives a compressor 24, generally of the centrifugal type, which pressurizes air and distributes it through a crossover duct 26 to a transition duct 28. Duct 28 opens to an upper housing 20 mounted to an elongated intake manifold 32.

An elongated aftercooler 34 extends the full length of housing 20 and manifold 32. Aftercooler 34 comprises a bundle of tubes 33 extending between headers 35 and 37 which connect with the engine coolant system. A series of plates 39 are positioned over tubes 33 at right angles to provide additional heat transfer. Intake air is evenly distributed throughout length of tubes 33 and passes between plates 39 to manifold 32. Manifold 32 has opposed side walls 29 and 31. Side wall 29 has openings in alignment with the engine intake ports 12, 14 and 16.

An intake manifold preheater in the form of a burner assembly 36 is positioned in side wall 31 of the intake manifold 32. The burner assembly comprises an outer housing 38 having an air atomizing nozzle 40 which receives fuel from a fuel supply system 41 via a line 43. A suitable system provides combustion air to the interior of housing 38 through conduit 45 for flow past the nozzle 40. An ignition device (not shown) ignites the fuel/air mixture and a flame retention head 42 holds and stabilizes the flame. As is particularly illustrated in FIGS. 1 and 2, the burner assembly 36 is positioned between ports 14 and 16. Thus, when the burner is in operation it provides a substantially uniform distribution of heat between these ports.

In order to enable a more even distribution of heat to the remote intake port 12, a heat distribution passage in the form of a tube 44 is provided. Although shown as a tube, it may also be provided as a cast section of the manifold. The distribution tube 44 has an inlet opening 46 adjacent the burner assembly 36. Preferably the plane of the inlet 46 is angled with respect to the axis of the distribution tube 44 so that the inlet 46 faces towards burner assembly 36. The outlet 48 of the distribution tube 44 is positioned at inlet port 12 and oriented so that the direction of flow out of the distribution tube 44 is generally parallel to flow into port 12.

When engine 10 is in operation and the burner is in use, the flame produced by it heats a portion of the air going into ports 14 and 16. A large portion of the air into these ports comes directly from the aftercooler 34 so that there is a mixture of heated and unheated air into ports 14 and 16. Since burner assembly 36 is between these ports, they receive air that has been heated to approximately the same temperature.

Figure 5:
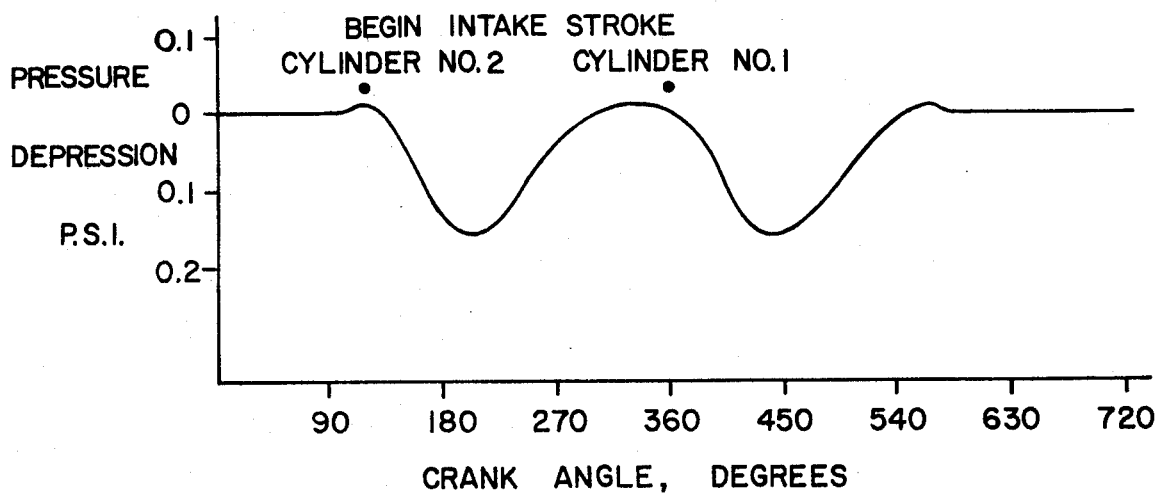
FIG. 5 is a graph illustrating variations in pressure as a function of degrees of crankshaft rotation for the heat distribution passages of FIGS. 1–4.

When the intake valves open for the cylinders supplied from port 12, there is a momentary lowering of pressure in that port. Outlet 48 is connected to port 12 so that a pressure differential is created between the inlet 46 and outlet 48 of distribution tube 44. As a result air passes through the distribution tube 44. Since inlet 46 is adjacent and faces the burner assembly 36, it will tend to draw the heated air from a point immediately adjacent the burner flame to the port 12. FIG. 5 illustrates the variation in pressure in the intake port 12 as a function of degrees of crankshaft rotation. Thus, as the intake valve for one of the cylinders served by port 12 opens, the rush of air into the cylinder lowers the pressure in the intake port. When the valve closes, the pressure in the port 12 returns to the ambient level indicated by a the horizontal portion of the curve. Since the port 12 serves two cylinders, there will be an additional rush of air when the other valve opens. When this occurs, the pressure is again lowered. The net effect of these cyclical pressure reductions is to induce an air flow through the distribution tube 44. The quantity of flow through this tube is adjusted to achieve an uniform heat distribution by varying the percentage of the total intake port area that the outlet 48 occupies. This, in effect, varies the proportion of the air drawn into the remote port 12 that is hot combustion gas from the burner flame. The remainder of air comes directly from the aftercooler 34. It has been found that a range of between 20% and 30% gives excellent heat distribution. It should be noted that some heat is lost from the distribution tube 44 through its exterior walls. However, since the tube is immersed in the intake manifold, the heat still becomes available to elevate the temperature of the intake air.

When the engine is operating without the burner assembly in use, the distribution tube 44 acts as an intake port extension and does not significantly effect the breathing of the port into which it protrudes. The effect of flow on the port 14, which it crosses, can be minimized by proper placement and tube cross sectional shape. It has been found that a tube of 1 ½ inch diameter extending across a port 14 having a height of 3 ¼ inches has no discernible effect on engine performance.

Figure 4:
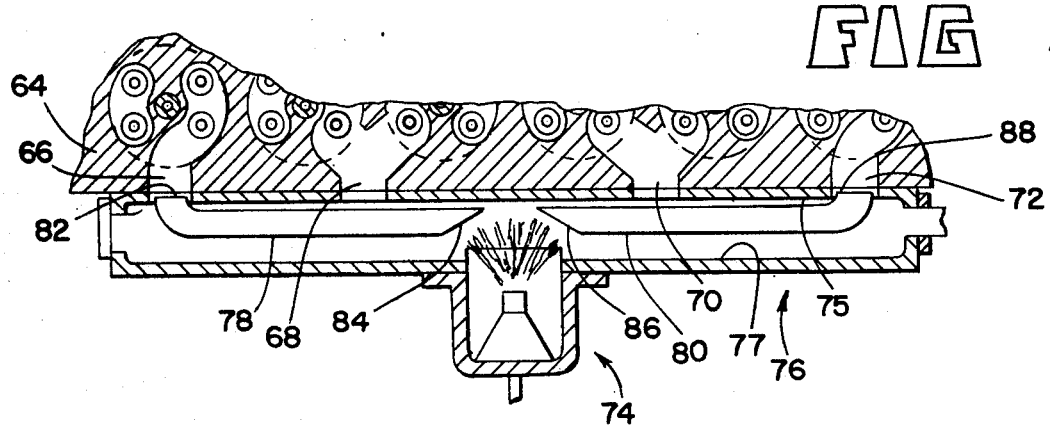
FIG. 4 is a fragmentary enlarged section view of the engine shown in FIG. 3 taken on lines 4—4 of FIG. 3.

The engine described above is an in-line type with three siamese intake ports. The invention, however, can be used with many different types of engine arrangements having more than one remote intake port. The engine 60 shown in FIGS. 3 and 4 is an example of an additional application for this invention. Engine 60 is of the V-type having an aftercooler housing 62 for both heads 64 of the engine 60. An elongated aftercooler 61, similar to aftercooler 34 extends the full length of housing 62 so that air passes in an even flow to an intake manifold 76. As shown in FIG. 4, the engine has intake ports 66, 68, 70 and 72. Aligned openings in a side wall 75 of manifold 76 connect with the engine intake ports. A burner assembly 74 identical in arrangement to assembly 36 described above is positioned in the opposite side wall 77 of intake manifold 76. As is particularly illustrated in FIG. 4, the burner assembly 74 is located between ports 68 and 70 thereby assuring a relatively even distribution of heat to these cylinders. Ports 66 and 72, however, are remote. To achieve even distribution of heat to these cylinders, heat distribution tubes 78 and 80, respectively, are employed. Distribution tube 78 has an inlet 84 adjacent burner assembly 74 and an outlet 82 positioned in intake port 66. Distribution tube 80 has an inlet 86 adjacent burner assembly 74 and an outlet 88 in intake port 72. Both openings 82 and 88 are preferably oriented so that the air flowing through them is in a direction generally parallel to the flow of air into ports 66 and 72.

During operation the distribution tubes 78 and 80 distribute heat in a manner identical to that for the system described above. A cyclic variation in pressure in the outlet induces a flow of heated combustion gases from the burner assembly 86.

The burner distribution tubes have been described with both three and four port engines. The invention is not limited to these alone and can be employed for any number of intake ports.

While several preferred forms of the present invention have been described, it should be apparent that other embodiments may be used without departing from the spirit and scope of this invention.

Having thus described the invention, what is claimed as novel and desired to be secured by Letters Patent of the United States is:

1. In a multi-stroke air breathing internal combustion engine including at least a pair of spaced intake ports for receiving air during the intake stroke thereof at which time the pressure in said parts is lowered, said apparatus comprising:
   an intake manifold for receiving intake air and distributing said air to said intake ports,
   an intake air preheater assembly mounted on said manifold for substantially local heating of intake air adjacent one of said ports and remote from the other; and,
   means forming a single elongated passage within said manifold and defining an inlet adjacent said preheater assembly, said inlet being positioned to permit direct distribution of heat from said preheater assembly to said adjacent port for heating a portion of the total air entering said adjacent port, said passage means extending to and defining a single outlet positioned at said remote engine intake port opening to be exposed to the reduction in pressure thereof during said intake stroke whereby a portion of the air heated by said preheater assembly is drawn through said passage from said burner to said remote port to heat a portion of the total air entering said port.

2. Apparatus as in claim 1 wherein said intake air preheater comprises a burner producing a flame, said manifold mounting said burner to direct said flame generally in a direction parallel to the direction of air flow into said intake ports.

3. Apparatus as in claim 2 wherein said passage means has an inlet opening angled with respect to the longitudinal axis thereof and facing toward said burner.

4. Apparatus as in claim 1 wherein said engine has three intake ports and said manifold mounts said preheater intermediate two of said ports, said passage forming means extending to the inlet of the third port.

5. Apparatus as in claim 4 wherein the flow into said intake ports is generally parallel to each other and said intake air preheater comprises a burner producing a flame, said manifold mounting said burner to direct said flame generally in a direction parallel to the flow of air into said intake ports.

6. Apparatus as in claim 1 wherein:

said manifold comprises an elongated chamber having opposed side walls, one of said side walls having openings connecting with said intake ports, said preheater burner assembly being mounted in the opposite side wall, said apparatus further comprises an elongated heat exchanger extending the length of said chamber and positioned to form the upper wall thereof, heat exchanger having airflow passages directing air into said chamber uniformly along the length thereof.

7. Apparatus as in claim 6 wherein:

said engine has three spaced intake ports and said manifold has three openings connecting with said ports;

said intake air preheater comprises a burner producing a flame, said manifold mounting said burner intermediate two of said ports; and, said tube extends to said third port.

8. Apparatus as in claim 6 wherein:

said engine has at least four spaced intake ports and said manifold has four openings connecting with said ports, two of said ports being central and two being remote;

said preheater comprises a burner producing a flame, said burner being positioned intermediate said central ports; and said passage means comprises means defining a pair of passages each having an opening adjacent said burner and extending to said remote ports.

9. Apparatus as in claim 8 wherein each of said passage means has an opening angled with respect to the longitudinal axis thereof and facing toward said burner.

* * * * *